US010045237B2

(12) United States Patent
Chen et al.

(10) Patent No.: US 10,045,237 B2
(45) Date of Patent: Aug. 7, 2018

(54) SYSTEMS AND METHODS FOR USING HIGH PROBABILITY AREA AND AVAILABILITY PROBABILITY DETERMINATIONS FOR WHITE SPACE CHANNEL IDENTIFICATION

(71) Applicant: Hong Kong Applied Science and Technology Research Institute Co., Ltd., Shatin, New Territories (HK)

(72) Inventors: Xiang Chen, Fanling New Territories (HK); Eddy Chiu, Kowloon (HK); Man Wai Kwan, Hong Kong (CN); Kong Chau Tsang, Hong Kong (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 305 days.

(21) Appl. No.: 14/682,568

(22) Filed: Apr. 9, 2015

(65) Prior Publication Data

US 2016/0302196 A1   Oct. 13, 2016

(51) Int. Cl.
*H04W 24/08* (2009.01)
*H04W 16/14* (2009.01)
*H04W 72/04* (2009.01)

(52) U.S. Cl.
CPC .......... *H04W 24/08* (2013.01); *H04W 16/14* (2013.01); *H04W 72/044* (2013.01)

(58) Field of Classification Search
CPC ..... H04W 16/14; H04W 24/08; H04W 72/02; H04W 72/044
(Continued)

(56) References Cited

U.S. PATENT DOCUMENTS 7,733,913 B1 *  6/2010  Cheung ............... H04L 45/245
                                                  370/474
8,473,989 B2 *  6/2013  Bahl ................... H04L 27/0006
                                                  725/73
(Continued)

FOREIGN PATENT DOCUMENTS

CN        101479999 A      7/2009
CN        103210676 A      7/2013
WO    WO 2012/092680      12/2012

OTHER PUBLICATIONS

Small Entity Compliance Guide, Part 15 TV Bands Devices, Third Memorandum Opinion and Order, 2012, http://www.fcc.gov/document/part-15-tv-bands-devices-0, 8 pages.
(Continued)

*Primary Examiner* — Un C Cho
*Assistant Examiner* — Shah Rahman
(74) *Attorney, Agent, or Firm* — Norton Rose Fulbright US LLP (57) ABSTRACT

Systems and methods which provide white space channel identification and/or selection using high probability area determinations for a device and availability probability calculations for channels based on a probability model are described. A white space device (WSD) may utilize spectrum scanner sensing results to determine one or more course high probability area (HPA) for the WSD. The sensing results may further be analyzed to derive probability information regarding the WSD being located at the HPAs, to thereby refine the HPAs. Thereafter, the information regarding probabilities of the WSD being located at the HPAs may be utilized with information from a white space location database to determine an availability probability of
(Continued)

one or more white space channels. One or more such white space channels may be identified and/or selected for use by the WSD.

33 Claims, 6 Drawing Sheets

(58) Field of Classification Search
USPC ........................................................ 370/328
See application file for complete search history.

(56) References Cited

U.S. PATENT DOCUMENTS

| | | | |
|---|---|---|---|
| 8,692,891 B2 | 4/2014 | Li et al. | |
| 2005/0080613 A1* | 4/2005 | Colledge | G06F 17/2785 704/9 |
| 2010/0075704 A1* | 3/2010 | McHenry | H04W 16/14 455/509 |
| 2010/0309317 A1 | 12/2010 | Wu et al. | |
| 2011/0250846 A1* | 10/2011 | Shu | H04W 72/06 455/67.7 |
| 2011/0306301 A1* | 12/2011 | Lubetzky | H04W 72/02 455/62 |
| 2011/0306375 A1 | 12/2011 | Chandra et al. | |
| 2012/0122477 A1* | 5/2012 | Sadek | H04W 16/14 455/456.1 |
| 2012/0314088 A1* | 12/2012 | Li | H04N 5/50 348/192 |
| 2013/0016221 A1* | 1/2013 | Charbit | H04W 16/14 348/180 |
| 2013/0078924 A1* | 3/2013 | Choudhury | H04W 16/14 455/62 |
| 2014/0113670 A1 | 4/2014 | Yucek | |
| 2014/0148183 A1 | 5/2014 | Stanforth et al. | |
| 2014/0200024 A1* | 7/2014 | Mueck | H04W 16/14 455/456.1 |
| 2014/0214994 A1* | 7/2014 | Rueckert | H04L 51/14 709/206 |
| 2014/0221000 A1* | 8/2014 | Roberts | H04W 16/14 455/454 |
| 2014/0228065 A1* | 8/2014 | Almeida | H04W 52/367 455/509 |
| 2014/0307565 A1* | 10/2014 | Samarasooriya | H04B 1/18 370/252 |
| 2015/0237506 A1* | 8/2015 | Irnich | H04W 16/14 455/454 |

OTHER PUBLICATIONS

Office Action issued for Chinese Application No. 201510263829.5 dated Jan. 4, 2018; 11 pages with English language translation.

* cited by examiner

SYSTEMS AND METHODS FOR USING HIGH PROBABILITY AREA AND AVAILABILITY PROBABILITY DETERMINATIONS FOR WHITE SPACE CHANNEL IDENTIFICATION

TECHNICAL FIELD

The invention relates generally to wireless communications and, more particularly, to identification and/or selection of white space channels using high probability area determinations and channel availability probability determinations.

BACKGROUND OF THE INVENTION

The use of wireless communications for carrying a variety of information has become widespread in the world today. For example, data, voice, and images (both still and moving) are commonly transmitted by wireless communications means. Such communications are transmitted wirelessly throughout the radio frequency (RF) spectrum.

In order to provide for organized utilization of the RF spectrum, as well as to reduce the potential for conflicting wireless communications within portions of the RF spectrum, a number of bands are typically identified whereby their use is regulated. For example, some bands of RF spectrum may be unlicensed bands, such as may be designated and controlled by a corresponding governmental body, whereby all wireless devices may operate within such a frequency band provided the devices conform to certain restrictions (e.g., meet transmission power limitations, adhere to particular channel requirements, accept interference from other such devices, etc.). Further, some bands of RF spectrum may be licensed bands, such as likewise may be designated and controlled by a corresponding governmental body, whereby only wireless devices operating in accordance with the license holder and conforming to restrictions of the license may operate within such a frequency band.

Wireless communications are utilized on such a scale in many parts of the world that availability of RF spectrum often presents a challenge, whether with respect to communications quality, reliability, and/or availability. Despite efforts to effectively and efficiently regulate the use of spectrum, there are inefficiencies in the utilization of some portions of the RF spectrum. Television (TV) channels, which are typically established from relatively wide frequency bands (e.g., 6 MHz channel bandwidth in the United States and 8 MHz channel bandwidth in Europe and parts of Asia), are provided in licensed bands allocated from a total bandwidth in the hundreds of MHz (e.g., 836 MHz in the United States and 336 MHz in Hong Kong), whereby particular channels are licensed in geographic areas so as to avoid conflict and interference. The typical licensed channel allocation technique often results in one or more unused TV channels (referred to as TV white space (TVWS)) within various geographic areas. Such channels going unused results in inefficient use of the RF spectrum within the corresponding geographic area. However, if such TVWS channels are to be used for other forms of communication (e.g., communications other than the licensed broadcast of TV programming), a white space device (WSD) or TV band device (TVBD) transmitting within a TVWS channel must not interfere with incumbent users of the licensed TV channel.

Two general approaches have been utilized for acquiring TVWS channels, those being geo-location with corresponding TVWS location database and TVWS sensing. According to the geo-location and TVWS location database technique, a WSD utilizes a geo-location detector (e.g., a global positioning system (GPS) location device) to determine its precise geographic location and reports this geographic location information to a TVWS location database for a determination of the TVWS channel(s) predetermined to be available in that particular location. In the TVWS sensing technique, a WSD utilizes a spectrum scanner to determine a list of TV channels which are detected by the WSD and selects one or more undetected TV channels as available TVWS channel(s).

The foregoing techniques are not, however, without disadvantage. For example, the geo-location and TVWS location database technique requires a very accurate location by the WSD (e.g., the Federal Communications Commission (FCC) in the United States requires a location determination to within 50 m accuracy). Although location devices, such as GPS location devices, may be capable of providing highly accurate location determinations, such location determinations are often not possible in particular situations. For example, a WSD disposed indoors or in a location surrounded by tall buildings or other structure causing location signal blockage and/or reflection may be unable to accurately determine position, thereby rendering the WSD incapable of utilizing the geo-location and TVWS location database technique.

As a further example, in using the TVWS sensing technique, the detection of TV channels by a WSD device may provide an unreliable source of data for determining available TVWS channels. In general, such sensing can only detect the presents of TV stations, not TV users. The received signal strength (RSS) of TV channels may vary dozens of dB, even at the same geographic areas, such as due to blockage of signals by mountains and buildings, the sensing device being located indoors/outdoors, higher/lower floors, etc. Accordingly, a WSD may determine a particular channel as being a TVWS channel (e.g., as not having been detected in the spectrum scan due to the WSD being disposed in a coverage shadow), but nevertheless interfere with nearby TV users which are able to receive the particular channel (e.g., as being disposed nearby, outside the coverage shadow), thereby presenting reliability issues with respect to such other users. Additionally, in using the TVWS sensing technique, the sensing threshold for detecting a TV channel is considerable more stringent than the TV service reception threshold (e.g., the FCC in the United States assumes −84 dBm/6 MHz of TV service reception threshold for digital TV (DTV) and −114 DBm/6 MHz for WSD sensing threshold). Accordingly, a particular TV channel may be identified as having been detected by a WSD, thus excluding the TV channel as an available TVWS channel, in locations where the TV channel may nevertheless not be utilized by other TV users, thereby presenting efficiency issues with respect to the utilization of the spectrum.

Various efforts to utilize the foregoing techniques have been proposed. Examples of such efforts may be found in U.S. Pat. No. 8,692,891 (the '891 patent), entitled "System and Method of implementing a TV Band Device with Enhanced Spectrum Sensing," and United States patent application publication numbers 2014/0148183 (the '183 application), entitled "System and Method for Verifying the Location of a Radio Device", and 2014/0113670 (the '670 application), entitled "TV White Space Database Assisted Locationing for TV Band Devices", the disclosures of which are hereby incorporated herein by reference.

The '891 patent utilizes a geo-location detector to determine the precise geographic location of the WSD and reports this geographic location information to a TVWS location database for a determination of the TVWS channel(s) predetermined to be available in that particular location. The WSD device then utilizes a spectrum scanner to scan the list of TVWS channels reported by the TVWS location database to confirm the availability of TVWS channels. Accordingly, this implementation mainly uses the TVWS location database information to rule out prohibited and undetectable channels, whereby the spectrum sensing is only used to verify the feedback information provided by the TVWS location database. The sensing operation employed, however, does not solve the aforementioned issues associated with the TVWS sensing technique.

In the '183 application, spectrum sensing data is utilized to verify the location of the WSD. Accordingly, the WSD utilizes a geo-location detector to determine the precise geographic location of the WSD and reports this geographic location information to a TVWS location database, whereby the TVWS location database identifies a RF footprint prediction for the reported location. The spectrum sensing data provided by the WSD spectrum scanner is correlated with the RF footprint data to verify the reported location of the WSD. The capability for highly accurate location determinations by the WSD, to pinpoint the location of the WSD in order to query the TVWS location database for TVWS channels, remain a requirement of this technique.

The '670 application utilizes trilateration techniques to determine the location of the WSD device. The WSD utilizes information (e.g., RSS and TV station name or channel numbers) of 3 TV transmitters to determine the WSD device location, whereby this location information is utilized by a TVWS location database for a determination of the TVWS channel(s) predetermined to be available in that particular location. Accordingly, the implementation utilizes information of at least 3 TV stations, RSS must be reported to estimate the distance, and special hardware is employed to detect the TV station names. The technique is not applicable when the same TV channel is used by multiple stations in a particular geographic area while the TV station names are unavailable to the WSD.

BRIEF SUMMARY OF THE INVENTION

The present invention is directed to systems and methods which provide white space channel identification and/or selection using high probability area determinations for a device and availability probability calculations for channels based on a probability model. Embodiments may, for example, be utilized with respect to a TV broadcast band to identify and/or select TVWS channels for a TVBD, or other WSD, to transmit within a TVWS channel.

In operation according to embodiments, a WSD may utilize spectrum scanner sensing results to determine one or more course high probability area (HPA) for the WSD. For example, the sensing results with respect to received channels provided by a WSD spectrum scanner may be analyzed (e.g., pattern recognition of strong received channels) to determine one or more nearby serving station, whereby one or more HPA may be determined for the WSD based upon known location information for the one or more serving station. The sensing results may further be analyzed to derive probability information regarding the WSD being located at the HPAs. For example, weighting may be assigned to the different channels in the sensing results (e.g., including both strong and weak received channels) for comparison to predicted sensing data to calculate probabilities with respect to the WSD being disposed at particular locations within the HPA. Thereafter, the information regarding probabilities of the WSD being located at the HPAs may be utilized with information from a white space location database to determine an availability probability of one or more white space channels. One or more such white space channels (e.g., channel(s) having the highest availability probabilities) may be identified and/or selected for use by the WSD, according to embodiments of the invention.

Accordingly, operation of in accordance with embodiments of the invention, a high probability area technique determines HPAs (which may include a plurality of high probability areas) and calculates the availability probabilities for TVWS channels based on a probability model. High probability area techniques of embodiments are operable even where only one TV station can be detected by a WSD. Moreover, the sensing results utilized by a high probability area technique may comprise no RSS information or just RSS order information (e.g., relative RSS as between the channels detected in a spectrum scan). The sensing results utilized according to embodiments may comprise RSS variances (e.g., the fluctuations of the RSS, which can be different under different propagation environments). Additionally, high probability area techniques implemented according to embodiments are applicable when the same channel is reused by multiple stations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
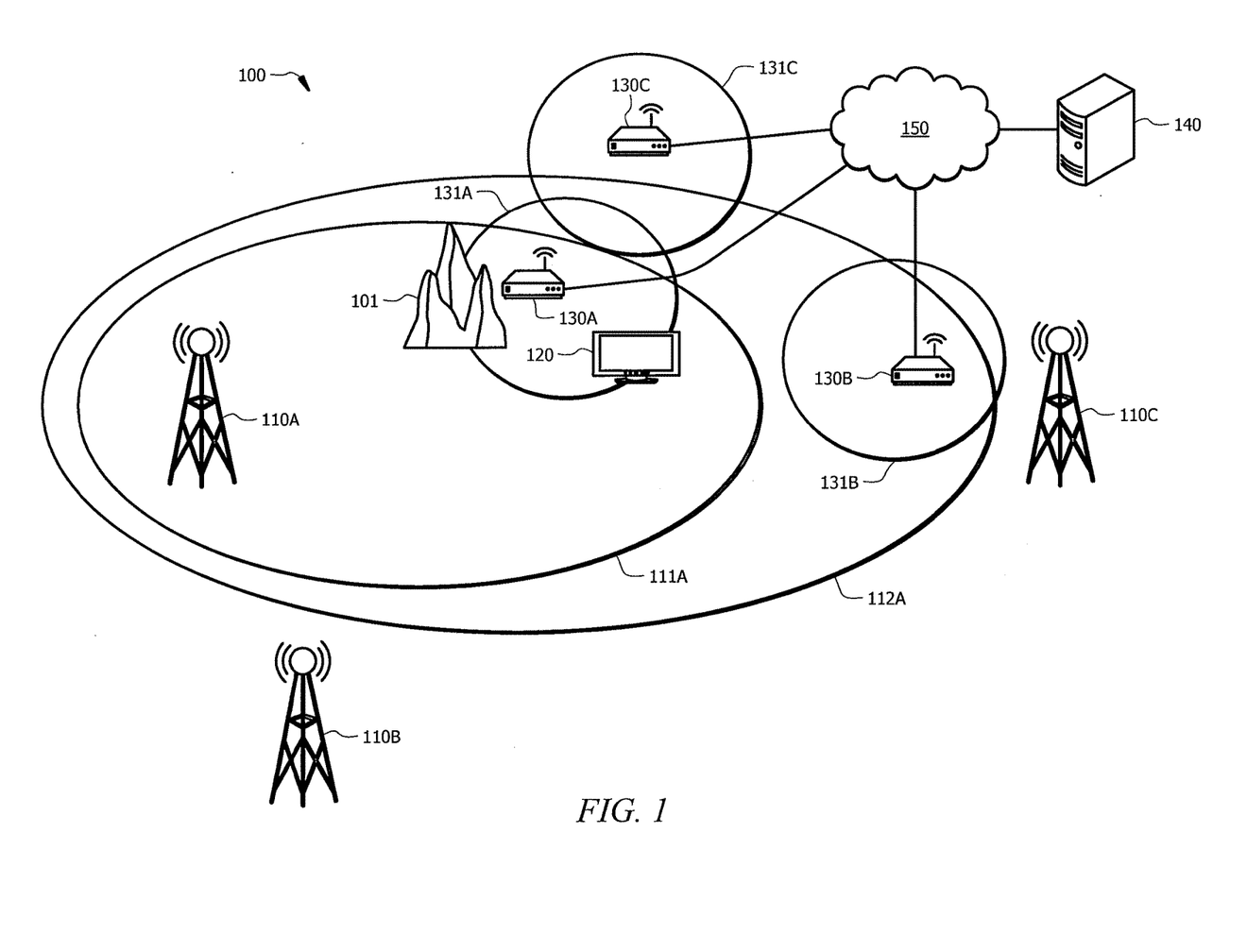
FIG. 1 shows a portion of a wireless communication system as may be adapted to implement a high probability area technique according to embodiments of the present invention.

FIG. 1 shows a portion of a wireless communication system as may be adapted to implement a high probability area technique for identifying and/or selecting white space channels according to embodiments of the invention. It should be appreciated that, although embodiments are described herein with reference to TV channels and the identification and selection of TVWS channels for use by WSDs, concepts of the present invention may be applied with respect to any number and type of wireless communications and wireless communication systems. The use of TV white space channels, however, is desirable in some situations due to their relatively large bandwidth and their propagation characteristics (e.g., TV channels are relatively low frequency allowing for long transmission distances using efficiently low transmission power levels).

Wireless communication system 100 illustrated in FIG. 1 includes TV stations 110A-110C operable to broadcast signals for use by incumbent users, as represented by incumbent device 120. Any or all such TV stations may utilize one or more TV channels, as may include different TV channels as well as possibly including one or more same TV channels (e.g., non-overlapping channel reuse or partially overlapping channel reuse), transmitted from various transmission sites. For example, TV station 110A may transmit on channels A, B, and C, TV station 110B may transmit on channels D, E, and F, and TV station 110C may transmit on channels A, G, and H. These channels may comprise analog TV channels, digital TV channels, or a combination thereof.

The incumbent devices, such as may comprise television sets, set-top boxes, streaming data devices, etc., may be disposed at various locations (e.g., different geographic locations, different floors within a building, different environments, etc.) and may be capable of receiving some or all channels from any or all of the TV stations. For example, in the illustrated example, incumbent device 120 is shown disposed within the coverage area of TV station 110A, as represented by reception area 111A (e.g., the area in which one or more channels transmitted by TV station 110A meet a specified service reception threshold). Although not shown in the illustrated example for simplicity, incumbent device 120 may likewise be within the coverage area of TV station 110B and/or TV station 110C. It should be appreciated that although a particular TV station transmits on a plurality of TV channels, not all such TV channels may have the same reception area (e.g., different transmission power levels may be utilized with respect to the TV channels of a TV station, propagation characteristics may be different as between the TV channels of a TV station, etc.). Accordingly, reception area 111A may represent the reception area of any or all of the TV channels transmitted on by TV station 110A.

One or more WSD may be deployed within wireless communication system 100, whereby such WSDs may utilize white space channels (e.g., otherwise unused TV channels within a particular geographic area) for conducting wireless communications. Such WSDs, represented by WSDs 130A-130C in the illustrated example, may comprise TVBDs or other forms of white space devices. The WSDs may, for example, be personal or portable TVBDs operable to communicate using channels of the TV band. WSDs of embodiments may, for example, comprise various forms of processor-based devices, such as user devices (e.g., personal computers (PCs), notebook computers, personal digital assistants (PDAs), cellular telephones, smart phones, tablet devices, workstation terminal devices, kiosk terminals, etc.), service provider devices (e.g., servers, head-end systems, back-end systems, operations, administration, maintenance, and provisioning (OAM&P) systems, etc.), and/or infrastructure devices (e.g., access points (APs), base stations (BSs), switches, routers, etc.).

As can be appreciated from the example illustrated in FIG. 1, WSD 130A is disposed in a shadow within reception area 111A, such as may result from topological structure 101 (e.g., a mountain, a building, etc.), thereby resulting in WSD 130A being substantially blocked from receiving one or more channels transmitted by TV station 110A. Accordingly, a traditional spectrum scan by WSD 130A may determine that one or more TV channels (channels A, B, and C) used by TV station 110A are white space channels. Incumbent device 120, however, is disposed nearby WSD 130A (with reception area 131A thereof). Thus, if WSD 130A were to utilize one or more TV channels of TV station 110A for conducting communications, reception of transmission on that TV channel by TV station 110A at incumbent device 120 would likely be interfered with, resulting in a reliability issue with respect to the incumbent device.

Unlike WSD 130A, WSD 130B is not disposed in the shadow within reception area 111A. In fact, WSD 130B is not disposed within reception area 111A, but rather is disposed just outside of the reception area in an area (represented by sensing area 112A) where reception of the TV channels transmitted on by TV station 110A are degraded to the point (e.g., low RSS) that reception of one or more of the TV channels transmitted by TV station 110A is not practical/reliable. Sensing area 112A of the illustrated example comprises an area in which the RSS of one or more TV channels used by TV station 110A are too low to meet a service reception threshold but which are sufficient to meet a specified sensing threshold, wherein the sensing threshold establishes a limitation with respect to utilization of a channel meeting the threshold as a white space channel (e.g., the RSS of the channel is too low for reliable use of the transmission, but too high to be considered white space according to a TVWS sensing technique). Accordingly, although reception area 131B of WSD 130B does not encompass incumbent device 120, WSD 130B may nevertheless be prevented from utilizing TV channels (channels A, B, and C) used by TV station 110A if a traditional TVWS sensing technique were to be employed, resulting in efficiency issues with respect to the reuse of such channels.

WSD 130C, disposed outside of the influence of TV station 110A may, for example, determine that TV channels used by TV station 110A are white space channels. Moreover, as incumbent device 120 is disposed outside of reception area 131C of WSD 130C, these white space channels may be utilized by WSD 130C of the illustrated example to provide efficient use of the spectrum without negatively impacting the reliability of incumbent device 120.

Wireless communication system 100 of embodiments may comprise various devices, systems, infrastructure, etc. in addition to the aforementioned TV stations, incumbent devices, and WSDs. For example, the embodiment of wireless communication system 100 illustrated in FIG. 1 includes enhanced white space channel server 140 in communication with WSDs 130A-130C, via network 150, to facilitate operation of a high probability area technique for white space channel identification and/or selection according to concepts of the present invention. Enhanced white space channel server 140 of embodiments may comprise one or more processor-based systems operable under control of one or more instruction set (e.g., software, firmware, applet, etc.) adapted to cooperate with WSDs to provide functionality as described herein, such as to identify and select white space channels for use by particular WSDs for conducting wireless communications. For example, enhanced white space channel server 140 may comprise servers and/or terminals in the form of one or more computer, workstation, kiosk terminal, portable processor-based device, etc. Such processor-based systems may comprise a central processing unit (CPU) (e.g., a processor from the PENTIUM or CORE line of processors available from Intel Corporation), memory (e.g., RAM, ROM, flash memory, disk memory, optical memory, etc.) storing the aforementioned one or more instruction set and/or other data used herein, and appropriate input/output circuitry and devices (e.g., network interface card (NIC), keyboard, digital pointer, display screen, peripheral interface, microphone, speaker, wireless interface, etc.). Network 150, providing communication links between WSDs 130A-130C and enhanced white space channel server 140, may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like.

It should be appreciated that, although the illustrated example of wireless communication system 100 shows a representative example of the number and configuration of TV stations, incumbent devices, WSDs, and servers as may be utilized according to embodiments herein, the concepts of the present invention are not limited to application to the particular number or configuration of devices shown. Accordingly, embodiments may comprise a number and/or configuration of any of the foregoing different than that shown in the illustrated embodiment.

Figure 2:
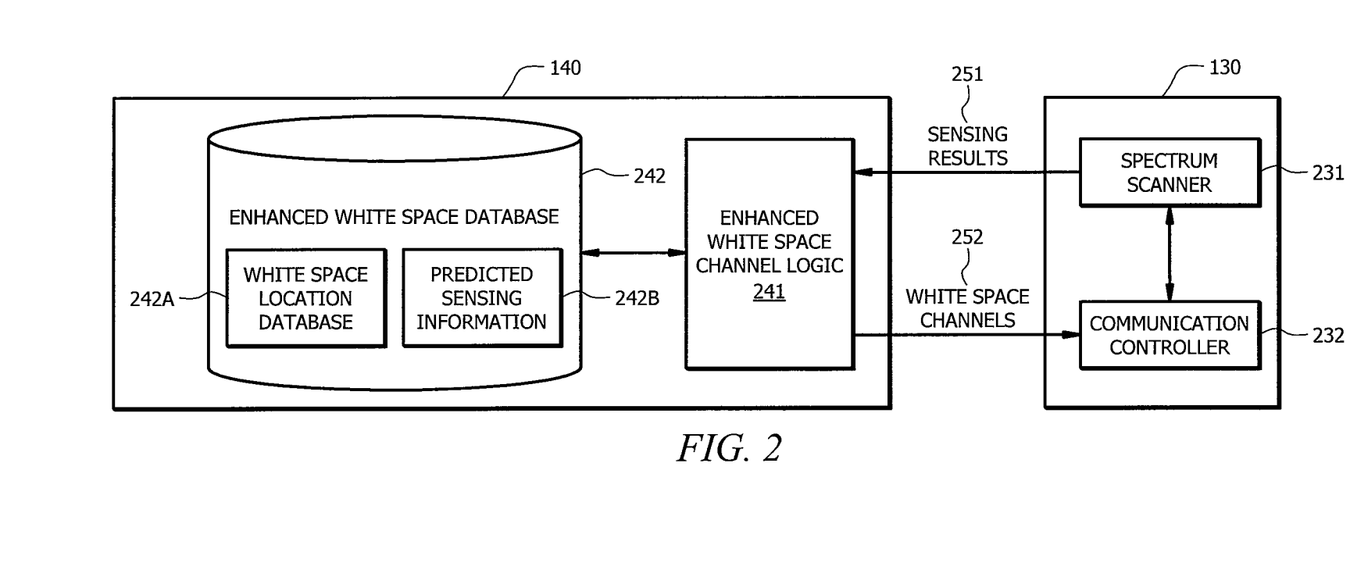
FIG. 2 shows detail with respect to configurations of a white space device and an enhanced white space channel server according to embodiments of the present invention.

Directing attention to FIG. 2, further detail with respect to configurations of a WSD and an enhanced white space channel server (e.g., enhanced white space channel server 140) according to embodiments is shown. It should be appreciated that, although the embodiment illustrated in FIG. 2 shows a particular division of functionality as between the exemplary WSD and enhanced white space channel server, alternative distributions of functionality may be utilized in accordance with the concepts herein. For example, some or all of the logic and/or database shown with respect the enhanced white space channel server may be implemented by the WSD. However, embodiments may utilize a configuration substantially as shown in order to reduce the resources included in each WSD operable to implement a high probability area technique in accordance with concepts herein. For example, the illustrated example, passing sensing results and resulting white space channel identification/selections between the WSD and the enhanced white space channel server facilitates relatively efficient adaptation of a WSD to function in accordance with embodiments herein.

The illustrated embodiment of WSD 130 (as may correspond to any or all of WSDs 130A-130C) is shown to include spectrum scanner 231. As will be better understood from the discussion which follows, spectrum scanner 231 may be adapted to scan one or more frequency bands (e.g., the TV broadcast band) to obtain information regarding the receive environment with respect to those frequency bands. Spectrum scanner 231 may further include logic for determining metrics regarding the scanned frequency bands (e.g., to determine RSS for individual channels, to determine RSS order information with respect to detected channels, to determine RSS variances, to determine channels meeting one or more threshold, such as a detection and/or reception threshold, etc.). For example, the probability distribution of the RRS can be described by its mean and variance, wherein the mean is the average RSS value during a time period, which is related to the transmit power, transmission distance, and propagation environment, while the variance describes the fluctuations of the RSS, which can be different under different propagation environments (e.g., urban or rural, line-of-sight or non line-of-sight, etc.). In operation according to embodiments, variance may be additional information (e.g., used in combination with the average RSS values), utilized in determining finer HPAs. In operation according to embodiments, logic of spectrum scanner 231 outputs sensing results, such as may comprise channels detected in one or more scans of a frequency band(s) and information associated therewith (e.g., RSS, RSS order, RSS variances, and/or other receive channel metrics).

WSD 130 of the illustrated embodiment is further shown to include communication controller 232. Communication controller 232 may, for example, include logic for controlling spectrum scanner 231 to initiate a scan of one or more frequency bands, to control the particular frequency bands scanned, to control output of sensing results by spectrum scanner 231, etc. For example, communication controller 232 may operate to cause spectrum scanner 231 to initiate a scan of one or more frequency bands, and subsequently request one or more white space channel, upon initial deployment of the WSD, periodically throughout operation of the WSD (e.g., to adapt to changes in the use of channels within wireless communication system 100), aperiodically during operation of the WSD (e.g., upon the occurrence of an event, such as experiencing unreliable communications on a white space channel, spectrum sensing results change, a channel list expires at the WSD, in response to a control from an operator or system in communication with the WSD, etc.), and the like, as well as combinations thereof. Communication controller 232 of embodiments is further adapted to control utilization of one or more white space channel by WSD 130. Accordingly, logic of communication controller 232 may receive information regarding white space channels provided by enhanced white space channel server 140, such as may include identification of white space channels available for use by the WSD and/or one or more white space channel selected for use by the WSD, and operate to control the WSD to implement communications using one or more white space channel. For example, communication controller 232 may operate to tune a transceiver(s) of the WSD to one or more white space channel selected by the enhanced white space channel server. Additionally or alternatively, embodiments of communications controller 232 may operate to select one or more particular white space channels from a list of available white space channels provided by the enhanced white space channel server and tune a transceiver(s) of the WSD to the selected channel(s).

It should be appreciated that white space devices, such as may comprise embodiments of WSD 130, may need to be certified by a respective (e.g., local or regional) regulator for operation within a particular area or region. The white space channel (e.g., TVWS) regulation framework may be different in different countries, regions, or other localities. Likewise, the different countries, regions, or other localities may use different frequencies, bandwidths, and TV formats. Therefore, white space devices, such as embodiments of WSD 130, may comprise regionally dependent configurations, whereby the device only needs to scan the channels, or some portion thereof, that are permitted by the local/regional regulator.

The illustrated embodiment of enhanced white space channel server 140 is shown to include enhanced white space channel logic 241 and enhanced white space database 242. As will be better understood from the discussion which follows, enhanced white space channel logic 241 of embodiments includes logic adapted to utilize sensing results with data from enhanced white space database 242 to determine a HPA for the reporting WSD and, using the HPA information, to determine an availability probability of one or more white space channels. Information regarding one or more such white space channels may thus be provided by enhanced white space channel logic 241 to communication controller 232 (e.g., as white space channels 252), for operation as described above, according to embodiments of the invention.

To facilitate the foregoing operation by enhanced white space channel logic 241, embodiments of enhanced white space database 242 include white space location database 242A and predicted sensing information 242B. The combination of such white space location database information and predicted sensing information provides an enhanced white space database of embodiments herein.

White space location database 242A may comprise information regarding the particular channels (e.g., TV channels) available and/or unavailable for use as white space channels at geographic locations throughout one or more wireless communication areas. For example, white space location database 242A may include a list of geographic coordinates (and/or other geographic location designation information) and corresponding available channel lists and/or prohibited channel lists. White space location database 242A of embodiments may, for example, comprise lists of available white space channel indices, lists of detectable channel indices, lists of predicted characteristics of detectable channels, lists of prohibited channels by regulation, lists of other entities registered for protection, and/or the like. White space location database 242A utilized according to embodiments of the invention may comprise a conventional TVWS location database. Additionally or alternatively, white space location database 242A may be generated utilizing channel transmission coverage information (e.g., measured and/or predicted RSS information for the different channels), information regarding buffer areas for maximum WSD transmit power levels (e.g., to accommodate coverage areas of the WSDs and the incumbent stations, such as TV stations, overlapping), prohibited channel lists (e.g., prohibited by regulation), information regarding protected channels/frequency bands (e.g., other entities registered for protection), and/or the like.

Predicted sensing information 242B may comprise information regarding the predicted attributes (e.g., RSS, RSS order, RSS variances, etc.) of particular channels (e.g., TV channels) as may be sensed or otherwise detected at geographic locations throughout one or more wireless communication areas. For example, predicted sensing information 242B may include a list of geographic coordinates (and/or other geographic location designation information) and corresponding predicted channel signal profiles (e.g., including predicted attributes of the sensed signals, station identification information, channel identification information, etc.). The predicted characteristics of detectable channels as stored by predicted sensing information 242B may be classified into groups, such as based on their similarities, in order to reduce computation complexity invoked when utilizing the information in accordance with the concepts herein. The predicted sensing information may be generated using known information regarding the transmitting stations (e.g., TV stations), such as geographic coordinates height, transmit power, frequency, antenna configurations, etc. of the transmission towers utilized by the different stations), appropriate propagation models for the transmitted signals (e.g. TV signal propagation models), appropriate topographic and morphographic information for the geographic areas of interest, and/or receiver geographic coordinates, antenna height, service threshold, etc. Predicted RSS information calculated by a mathematical model, such as using the foregoing known information, may be verified and/or corrected through the use of empirical measurements (e.g., using empirical measurements made at some locations within the coverage area) in providing predicted sensing information of embodiments. It should be appreciated that the service providers (e.g., TV broadcast stations) will likely have conducted some measurements for their own network planning, whereby such measurements may additionally or alternatively be utilized in generating predicted sensing information according to embodiments herein. In operation according to embodiments, the predicted sensing information can be refined with the feedback information from some WSDs (e.g., sensing results from WSDs with both GPS and spectrum scanner).

Figure 3A:
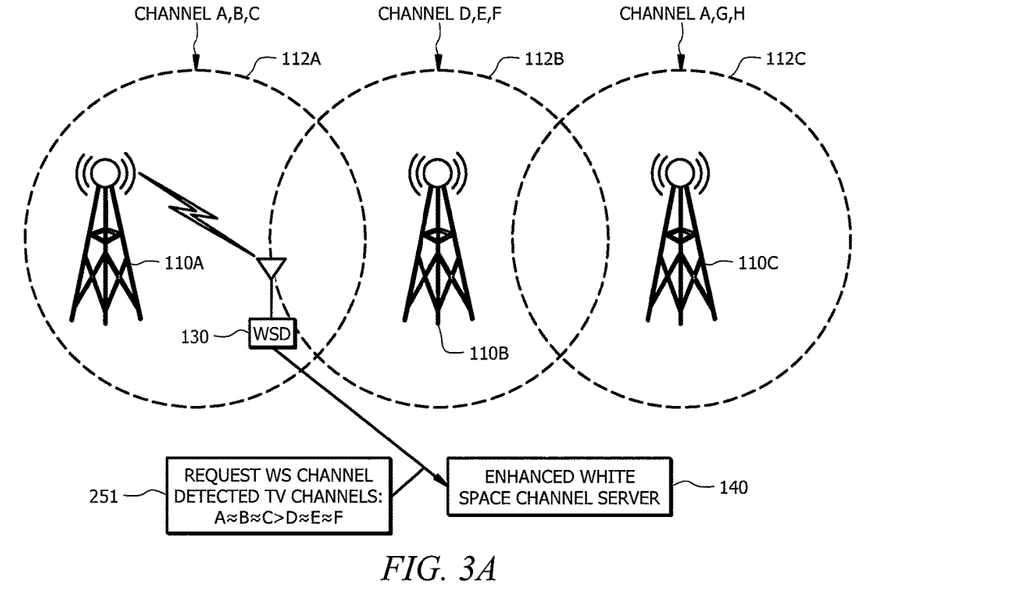
FIGS. 3A and 3B show operation of a high probability area technique according to embodiments of the present invention.
Figure 3B:
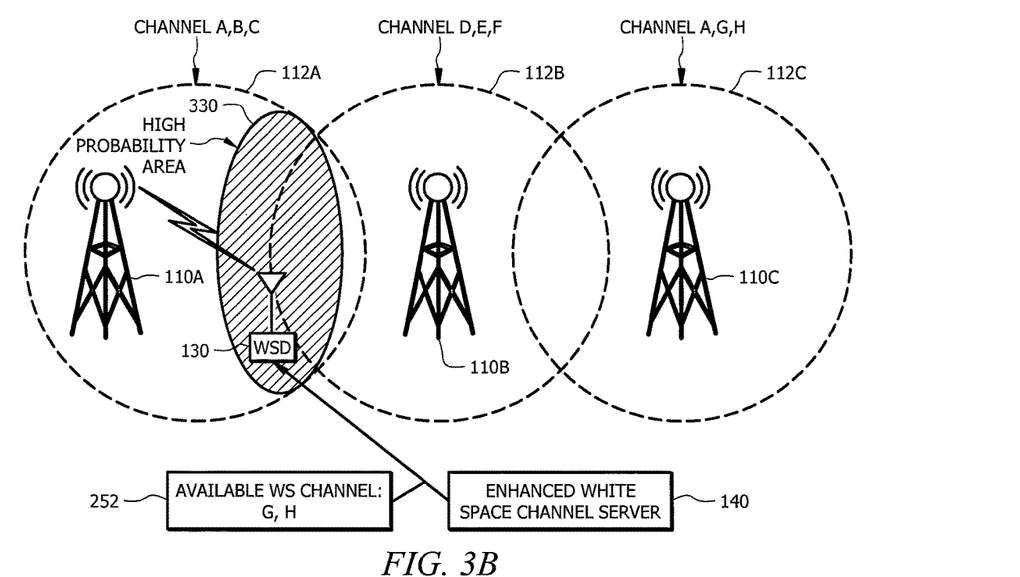

FIGS. 3A and 3B illustrate the foregoing operation of WSD 130 and enhanced white space channel server 140 according to embodiments. In the example of FIGS. 3A and 3B, TV station 110A is transmitting on channels A, B, and C, TV station 110B is transmitting on channels D, E, and F, and TV station 110C is transmitting on channels A, G, and H. WSD 130 is disposed in an area in which one or more channels transmitted by TV station 110A may be received or otherwise detected (represented here by sensing area 112A) and in which one or more channels transmitted by TV station 110B may be received or otherwise detected (represented by sensing area 112B). Notably, however, WSD 130 is disposed outside of the area in which one or more channels transmitted by TV station 110C may be received or otherwise detected (represented by sensing area 112C). Accordingly, when operating to request a white space channel, as shown in FIG. 3A, WSD 130 includes TV channels A, B, C, D, E, and F in sensing results 251. In the illustrated embodiment, RSS order information for the detected channels is provided in the sensing results, as represented by channels A, B, and C being greater than channels D, E, and F (e.g., due to TV station 110A being disposed more near WSD 130 than is TV station 110B). In operation according to embodiments, as shown in FIG. 3B, enhanced white space channel logic 241 of enhanced white space channel server 140 utilizes the sensing results with data of enhanced white space database 242 to determine a HPA (represented as HPA 330) for the reporting WSD. Enhanced white space channel logic 241 further utilizes sensing results with additional data from enhanced white space database 242 to calculate probabilities with respect to the WSD being disposed at particular locations within the HPA, according to embodiments. Thereafter, the information regarding probabilities of the WSD being located at the HPAs may be utilized by enhanced white space channel logic 241 with information from enhanced white space database 242 to determine an availability probability of one or more white space channels. One or more such white space channels (e.g., channel(s) having the highest availability probabilities) may be provided as white space channels 252 (shown here as including TV channels G and H), according to embodiments of the invention.

Figure 4:
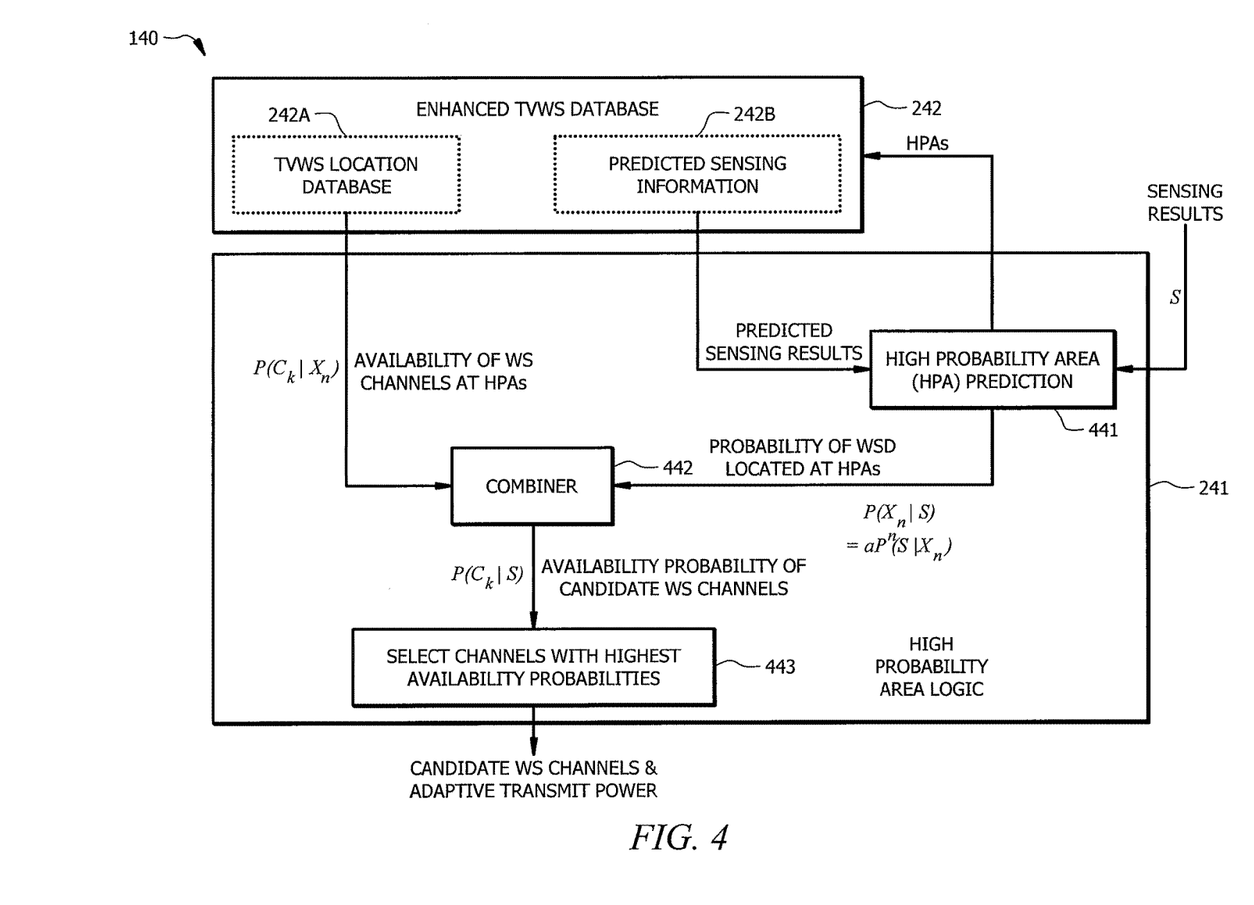
FIG. 4 shows a functional block diagram of high probability area logic according to embodiments of the present invention.
Figure 5:
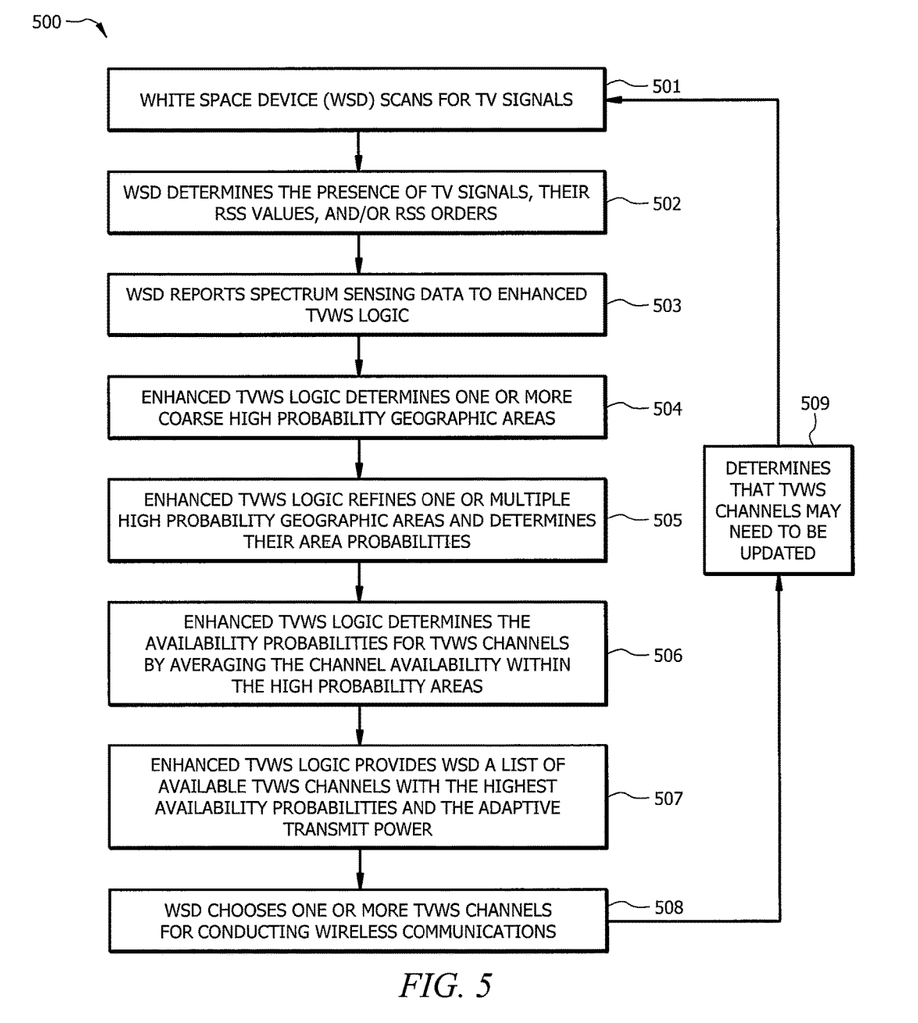
FIG. 5 shows a flow diagram of operation of a high probability area technique according to embodiments of the present invention.

FIGS. 4 and 5 show further detail with respect to operation of an enhanced white space channel server according to embodiments of the invention. In particular, FIG. 4 shows a high level functional block diagram of an embodiment of enhanced white space channel server 140, while FIG. 5 shows a flow diagram of operation in accordance with embodiments of the invention.

Operation in accordance with flow 500 of the illustrated embodiment of FIG. 5 begins at block 501 wherein WSD 130 scans for TV signals. For example, spectrum scanner 231 may scan the TV band, or some portion thereof, for TV signals. Such scanning may be initiated for a number of reasons, such as upon initial deployment of the WSD, periodically throughout operation of the WSD, aperiodically during operation of the WSD, etc.

At block 502 of the illustrated embodiment, WSD 130 operates to determine the presence of TV signals and one or more metrics thereof. For example, logic of spectrum scanner 231 may operate to determine the presence of one or more TV signals and measure one or more metric associated therewith, such as the RSS values of the TV channels detected, the RSS orders of the TV channels detected, etc.

In operation according to the illustrated embodiment, WSD 130 operates to report the sensing results to enhanced TVWS logic, at block 503, such as to request information regarding one or more white space channels as may be available for use by the WSD. For example, spectrum scanner 231 may provide sensing results 251 to enhanced white space channel logic 241 according to embodiments of the invention. Sensing results 251 may, for example, comprise a list of detected channel indices, a list of detected channel indices with RSS values, a list of detected channel indices with RSS orders, etc. It should be appreciated that, although channel indices are a convenient means for identifying the particular channels detected, embodiments are not limited to the use of channel indices. For example, embodiments may operate to additionally or alternatively identify particular channels based upon the center frequency of the channels.

Having been provided appropriate sensing results for the WSD, enhanced white space channel logic adapted according to embodiments of the invention operates to provide white space channel identification and/or selection using high probability area determinations for the WSD and availability probability calculations for channels based on a probability model (e.g., as set forth in the exemplary processes of blocks 504-507 of the illustrated embodiment of flow 500). In operation according to embodiments, as described in further detail below, enhanced white space channel logic 241 determines coarse HPAs, such as using pattern recognition of strong TV channels and/or determines one/multiple nearby serving TV stations, using the sensing results and information from enhanced white space database 242. Enhanced white space channel logic 241 of embodiments further operates to assign weights (e.g., inversely proportional to the serving coverage area of each channel) to different channels in the sensing results and to refine the HPA(s) for the WSD using the weighted channels, such as based on correlations between the reported sensing data and predicted sensing data with assigned channel weights within the coarse HPAs. Enhanced white space channel logic 241 of embodiments may then operate to assign area probabilities by mapping the aforementioned correlations to probabilities. For example, a mapping between the correlation and the area probabilities may be determined based on functions such as probability density functions of Gaussian distributions, log-normal distributions, measured statistics, etc.

To aid in understanding concepts of the present invention, let S represent the sensing results provided by a WSD, $X_n$ represent the event that the WSD is disposed at location n, and $C_k$ represent the event that the $k^{th}$ channel is an available white space channel for the WSD. The availability of the $k^{th}$ channel as a white space channel for the WSD, which provides the sensing result S, may be expressed as an availability probability function. In providing the aforementioned availability probability function according to embodiments, it can be assumed that the channel availability $C_k$ is determined by the WSD's location $X_n$, which may be queried from white space location database 242A with respect to one or more HPAs in which the WSD may be located within, as described in further detail below. Therefore, $P(C_k|X_n,S)=P(C_k|X_n)$. Further, knowing the sensing result S (e.g., as provided by the WSD), and assuming that the WSD is located with respect to any particular location within the one or more HPAs with equal probabilities, $P(X_n)$ is a constant, and thus P(S) is a constant for a given S. Therefore, $$P(X_n\mid S)=\frac{P(S\mid X_n)P(X_n)}{P(S)}=\alpha P(S\mid X_n),$$

wherein α is a normalizing factor such that $$\sum_n \alpha P(S\mid X_n)=\sum_n P(X_n\mid S)=1.$$

An availability probability function for the probability that the $k^{th}$ channel is an available white space channel for the WSD, wherein the higher the availability probability, the lower the probability the channel may interfere with incumbent users, may be given as $$P(C_k\mid S)=\frac{P(C_k,S)}{P(S)}$$

$$=\frac{\sum_n P(C_k,X_n,S)}{P(S)}$$

$$=\frac{\sum_n P(C_k\mid X_n,S)P(X_n\mid S)P(S)}{P(S)}$$

$$=\sum_n P(C_k\mid X_n,S)P(X_n\mid S)$$

$$=\alpha\sum_n P(C_k\mid X_n)P(S\mid X_n).$$

Operation to provide white space channel identification and/or selection using high probability area determinations for a WSD and availability probability calculations for white space channels based on the foregoing availability probability function according to embodiments is further described with reference to the enhanced white space channel logic functional blocks of FIG. 4 and the processes of blocks 504-507 of FIG. 5.

At block 504 of the illustrated embodiment of flow 500, enhanced white space channel logic 241 determines one or more coarse HPA for the WSD. In operation according to embodiments, HPA prediction logic 441 (FIG. 4) may analyze the sensing results and information available from enhanced white space database 242 (e.g., information regarding transmit channel, transmit power, and transmitter location for incumbent stations in the wireless communication system, as may be available from white space location database 242A) to determine one or more HPA for the WSD. For example, information regarding particular channels in the sensing results provided by spectrum scanner 231 may be analyzed (e.g., to identify one or more patterns of strong received channels with areas or regions within the wireless communication area and determine one or more nearby serving station), whereby one or more HPA may be determined for the WSD (e.g., based upon known location information for the one or more serving station). In particular, different TV stations use different channel combinations. Thus, by searching the channel combinations within the sensing results, embodiments of HPA prediction logic 441 may determine one or more nearby serving TV stations, whereby the coverage areas of these stations may be used to determine the coarse HPAs (e.g., the area of overlapping coverage for nearby serving TV stations may be utilized to provide an HPA).

In operation at block 505 of the illustrated embodiment, enhanced white space channel logic 241 operates to refine some or all of the coarse HPAs determined with respect to the WSD. In operation according to embodiments, HPA prediction logic 441 may utilize the coarse HPAs to query information regarding predicted sensing results available from enhanced white space database 242 (e.g., information regarding channel RSS, channel RSS order, channel identification, for particular locations, areas, and/or regions within the HPAs as may be available from predicted sensing information 242B) to refine the coarse HPAs and determine their area probabilities. For example, RSS and/or RSS order for particular channels (e.g., TV channels) may be predicted with respect to geographic locations throughout a wireless communication area. The RSS and/or RSS order for the channels sensed or otherwise detected by the WSD, as provided in the sensing results, may be correlated with the foregoing predicted sensing information to thereby refine the HPA(s) determined for the WSD. Accordingly, embodiments operate to further refine the HPAs by calculating correlations between the reported sensing data and the predicted sensing data. In operation according to embodiments, the correlations lower than a predetermined threshold may be filtered out of the results as being unlikely locations for the WSD.

Embodiments preferably operate to calculate probabilities with respect to the WSD being disposed at locations within the HPAs, and thus determine their area probabilities. For example, weighting is assigned to the different channels in the sensing results (e.g., including both strong and weak received channels) for comparison to predicted sensing data to calculate probabilities with respect to the WSD being disposed at particular locations within the HPA, according to embodiments. It should be appreciated that different TV stations use different transmit power, and each channel will generally have different coverage areas. Detection of channels with smaller coverage areas tells more information about a device's location than the channels with larger coverage areas. Therefore, the weights assigned to different channels according to embodiments may be inversely proportional to the serving coverage area of each channel, for example. In operation according to embodiments, the probabilities are mapped to the above correlations (e.g., to provide information regarding the probability of the WSD being locations within the HPAs), such as for use in calculating the availability probability for white space channels.

At block 506 of the illustrated embodiment of flow 500, enhanced white space channel logic 241 determines availability probabilities for white space channels. In operation according to embodiments, logic of combiner 442 may utilized the refined HPAs to query enhanced white space database 242 (e.g., information regarding available white space channels at locations within the refined HPAs, as may be provided by white space location database 242A) for availability of white space channels at the HPAs. Logic of combiner 442 of embodiments may utilize the information regarding availability of white space channels at the HPAs and information regarding the probability of the WSD being located at the HPAs (e.g., as provided by HPA prediction logic 441) in determining the availability probabilities for various white space channels. For example, combiner 442 of embodiments may average the availability of the white space channels within the HPAs to obtain the availability probabilities of each channel.

As an example of averaging the availability of the white space channels in operation according to embodiments, the HPA may be divided into many blocks (e.g., 10 meters by 10 meters), whereby, for each such block, the availability of each channel may be known (e.g., as may be provided by the information of white space location database 242A). Within the HPA, the probabilities with respect to the WSD being disposed at particular blocks may be calculated by logic 241, whereby the summation of all such probabilities is one. For each channel, the availability probability may be calculated by adding the probabilities of the blocks within which this channel is available.

One or more white space channel is selected by enhanced white space channel logic 241 as candidate white space channels for use by the WSD by channel selection logic 443 of the illustrated embodiment. For example, channel selection logic 443 of embodiments may operate to select the channel(s) with the highest availability probability as candidate white space channels for the WSD. In operation according to embodiments, the WSD is informed of the selected candidate white space channel(s) for initiating communication using one or more such white space channel. For example, channel selection logic 443 may provide a list of one or more white space channels (e.g., as white space channels 252, FIG. 2) for use by communication controller 232 of WSD 130 in identifying and/or selecting one or more white space channels for use by the WSD.

Information regarding the candidate white space channels provided by enhanced white space channel selection logic 241 of embodiments may include information in addition to identification of particular white space channels. For example, embodiments of a candidate white space channel list provided to WSD 130 according to embodiments herein includes information regarding appropriate transmit power levels for some or all of the candidate white space channels. For example, information regarding the location of the WSD (e.g., based upon the refined HPA information), the incumbent transmission stations, and/or incumbent devices may be utilized to determine appropriate transmission power levels to be used with respect to individual white space channels by the WSD. The transmit power assigned to each candidate channel may be determined, for example, by its availability probability. In operation according to embodiments, there may be a pre-determined mapping function between availability probability and transmit power levels (e.g. when the availability probability for a channel is equal to one, the maximum permitted power can be used for this channel, whereas a lower power may be assigned for the channel with a lower availability probability). In accordance with embodiments, if the availability probability is lower than a predetermined threshold, zero power may be assigned/allowed for this channel.

In operation at block 508 of the illustrated embodiment of flow 500, WSD 130 utilizes the candidate white space channel information to select one or more white space channels for conducting communications. For example, communication controller 232 may operate to select one or more white space channels from a list provide by enhanced white space channel selection logic 241 and control a transmitter and/or receiver of WSD 130 to initiate communications using the selected white space channel(s). In operation according to embodiments, WSD 130 assumes that white space channels 252 determined by enhanced white space channel selection logic 241 are all safe to use by this WSD under some constraints (e.g., limited transmit power, such as may be indicated by the enhanced white space channel selection logic). In selecting one or more white space channels for use by the WSD, WSD 130 may, for example, estimate the noise floor and the interference from nearby WSDs on each candidate channel, and choose the most "clean" channels for its own communication.

Embodiments of the invention may operate to reconsider or re-determine the use of white space channels by the WSD, such as to accommodate changes in the usage of channels by incumbent devices, changes in the topography or morphology of the communication area, etc. Accordingly, at block 509 of the illustrated embodiment, a determination is made (e.g., by communication controller 232 of WSD 130, by logic of enhanced white space channel selection logic 241, etc.) regarding the use of white space channels by a WSD being updated. An update regarding the use of white space channels may be initiated, for example, periodically throughout operation of the WSD (e.g., to adapt to changes in the use of channels within wireless communication system 100) and/or aperiodically during operation of the WSD (e.g., upon the occurrence of an event, such as experiencing unreliable communications on a white space channel, spectrum sensing results change, a channel list expires at the WSD, in response to a control from an operator or system in communication with the WSD, etc.). For example, a WSD may re-query the enhanced whites space channel logic for one or more white space channel when the sensing results change or the channel list expires. When it is determined that the use of one or more white space channel is to be updated at block 509, the illustrated of flow 500 returns to block 501 to initiate a scan of one or more frequency bands and subsequently request one or more white space channel. When operating to provide such re-determining of the availability of white space channels, operation of flow 500 of embodiments herein may base the availability probability of white space channels on the current and previous reported spectrum sensing data.

From the foregoing exemplary embodiments, it can be appreciated that operation of in accordance with concepts of the invention, a high probability area technique may utilize the foregoing sensing results to determine and refine HPAs, embodiments of the invention are operable to identify white space channels without the use of a location detector (e.g., a GPS location device). Such operation may be particularly useful with respect to certain common environments, such as indoor environments, urban environments having a concentration of tall buildings or other structure causing location signal blockage and/or reflection, and other environments where a device may be unable to accurately determine position. Moreover, the sensing results utilized by exemplary embodiments described above may comprise no RSS information or only RSS order information (e.g., relative RSS as between the channels detected in a spectrum scan). Additionally, it should be appreciated that embodiments described above are applicable when the same channel is reused by multiple stations and where only the transmission of one station can be detected by a WSD.

It should be appreciated that various of the foregoing functions, modules, and/or processes, or portions thereof, may be implemented as one or more instruction set operable upon processor-based systems. For example, embodiments of the aforementioned enhanced white space channel selection logic, communication controller, and spectrum scanner may comprise instruction sets executable upon a processor of a communication station or other device (e.g., a user device, WSD, network infrastructure, server, etc.). When implemented in software, elements of the present invention may comprise the code segments to perform tasks as described herein. The program or code segments can be stored in a processor readable (e.g., computer readable) medium. The "processor readable medium" may include any non-transitory medium that can store information. Examples of the processor readable medium include an electronic circuit, a semiconductor memory device, random access memory (RAM), a read only memory (ROM), a flash memory, an erasable ROM (EROM), a magnetic disk memory, an optical disk memory, etc.

Figure 6A:
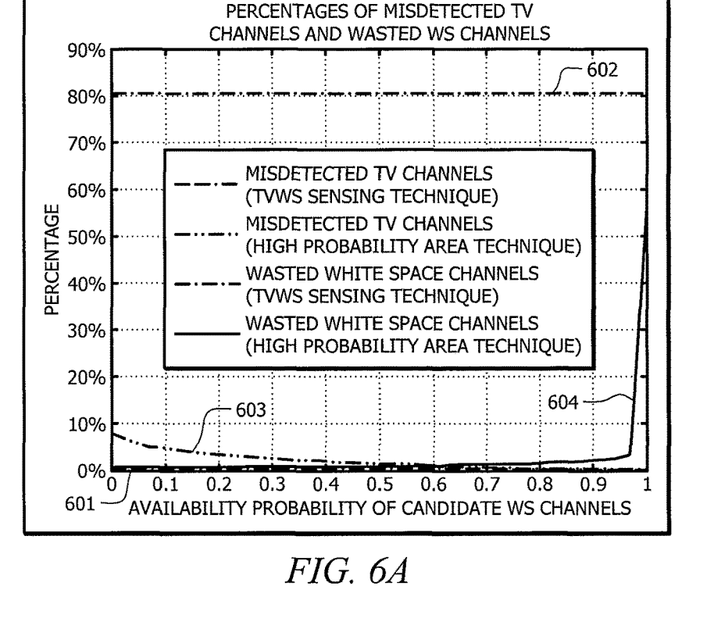
FIGS. 6A and 6B show efficiency and reliability improvements available through operation of a high probability area technique according to embodiments of the present invention.
Figure 6B:
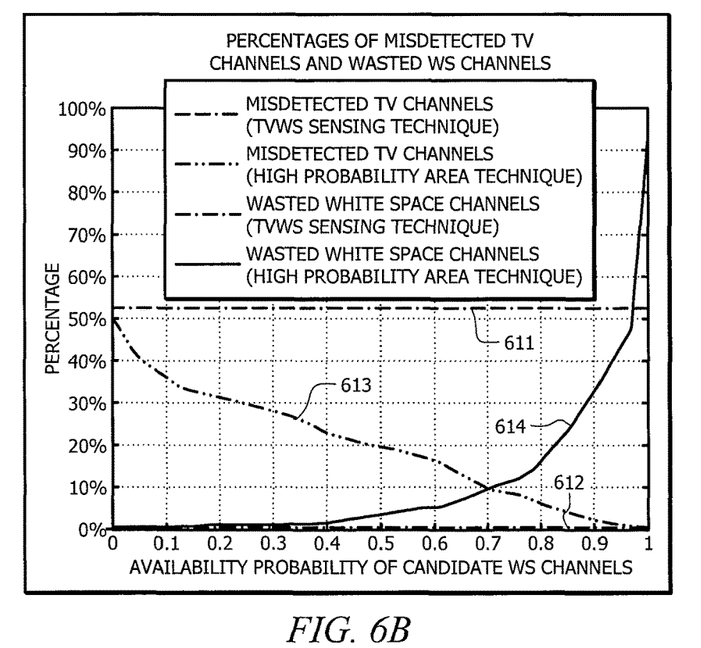

Above described embodiments of a high probability area technique provide white space channel sensing and selection operation which exploit the distinct location-channel-power profile of transmitted channels at different geographic areas, reduce the likelihood of interfering with incumbent services, increase the efficiency of white space channel usage, and is robust with respect to various sensing scenarios (e.g., outdoor, indoor, rooftop, etc.). Simulation results illustrating the efficiency and reliability improvements (e.g., minimizing the percentage of misdetected TV channels while maintaining a low percentage of wasted white space channels) available through operation of embodiments of a high probability area technique according to concepts herein are shown in FIGS. 6A and 6B. It should be appreciated that the simulation results were conducted with respect to a particular, unique environment and thus do not represent general quantitative results of operation of embodiments of the invention. The simulation results are provided herein to provide an example of improvement which may be realized in accordance with the application of concepts herein, and are not intended to limit the scope of the embodiments or concepts described herein.

The graph of FIG. 6A shows simulation results for a rooftop deployment of a WSD antenna, wherein the received TV signal strength values experienced by the WSD are approximately 30 dB higher than the expected values defined by FCC regulations (e.g., misdetection of channels is not the main issue). In the graph of FIG. 6A, line 601 represents the misdetected TV channels when using a conventional TVWS sensing technique, line 602 represents the wasted white space channels when using the conventional TVWS sensing technique, line 603 represents the misdetected TV channels when using a high probability area technique of the present invention, and line 604 represents the wasted white space channels when using a high probability technique of the present invention. As can be appreciated from the simulation results of FIG. 6A, in this situation approximately 80% of the white space spectrum is wasted where the conventional TVWS sensing technique is used. However, where the high probability area technique of an embodiment of the present invention is used, near optimum performance is achieved.

The graph of FIG. 6B shows simulation results for an indoor deployment of a WSD antenna, wherein the many weak TV signals are misdetected by the WSD due to approximately 35 dB gain loss associated with this scenario (e.g., misdetection of channels is the main issue). In the graph of FIG. 6B, line 611 represents the misdetected TV channels when using a conventional TVWS sensing technique, line 612 represents the wasted white space channels when using the conventional TVWS sensing technique, line 613 represents the misdetected TV channels when using a high probability area technique of the present invention, and line 614 represents the wasted white space channels when using a high probability technique of the present invention. As can be appreciated from the simulation results of FIG. 6B, in this situation more than 50% of the utilized TV channels are misdetected (e.g., a high likelihood of interference by the WSD utilizing one or more such channels is present) where the conventional TVWS sensing technique is used. However, where the high probability area technique of an embodiment of the present invention is used, the misdetection of occupied TV channels is significantly reduced while most white space channels are usable.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of determining candidate white space channels for use by a white space device (WSD), the method comprising:

obtaining sensing results from the WSD, the sensing results including information regarding television (TV) channel signals detected by the WSD without a location determination provided by the WSD;

determining one or more coarse high probability geographic areas (HPAs) in which the WSD has a high probability of being disposed in based upon at least a portion of the sensing results, wherein each HPA of the one or more coarse HPAs correspond to a respective geographic area comprising a plurality of locations at which the WSD may be located;

calculating probabilities with respect to the WSD being disposed at a plurality of particular locations within the determined one or more coarse HPAs using at least an additional portion of the sensing results to thereby provide one or more refined HPAs having unlikely locations for the WSD filtered from the determined one or more coarse HPAs;

calculating availability probabilities for TV white space channels of unused TV channels within the one or more refined HPAs based upon an availability probability function summing the probabilities with respect to the WSD being disposed at particular locations within the one or more refined HPAs corresponding to respective ones of a plurality of subdivisions of the one or more refined HPAs for which information regarding availability of the TV white space channels within the plurality of subdivisions of the one or more refined HPAs indicates a particular white space channel is available, wherein an availability probability of the availability probabilities for a respective TV white space channel provides a probability the respective TV white space channel is an available white space channel for the WSD and will not interfere with incumbent users; and selecting one or more TV white space channels having highest availability probabilities as the candidate white space channels for use by the WSD.

2. The method of claim 1, wherein the sensing results include information to identify channels in which channel signals were detected by the WSD and one or more of receive signal strengths for the channel signals detected by the WSD, receive signal strength orders for the channel signals detected by the WSD, or receive signal strength variances for the channel signals detected by the WSD.

3. The method of claim 1, wherein the determining the one or more coarse HPAs comprises:

identifying one or more strong channel signals in the sensing results;

using pattern matching to match the one or more strong channel signal with transmission station locations from an enhanced white space database, the enhanced white space database having channel usage location information and coverage area information for the transmission stations stored therein; and defining the one or more coarse HPAs based at least in part on coverage areas of the stations matched to the one or more strong channel signals.

4. The method of claim 3, wherein the enhanced white space database further has predicted sensing information for a plurality of locations, wherein the calculating probabilities with respect to the WSD being disposed the plurality of particular locations within the determined one or more coarse HPAs comprises:

correlating the at least an additional portion of the sensing results with the predicted sensing information from the enhanced white space database for one or more locations of the coarse HPAs.

5. The method of claim 4, wherein the enhanced white space database comprises prediction characteristic information including at least one of transmission station physical attribute information, communication area geographic information, or signal propagation models for the channel signals, whereby the prediction characteristic information is utilized to calculate predicted characteristics of the channel signals and thereby provide the predicted sensing information.

6. The method of claim 4, wherein the predicted sensing information comprises at least one of predicted receive signal strength values, predicted receive signal strength orders, or predicted receive signal strength variances.

7. The method of claim 4, wherein calculating availability probabilities for the TV white space channels comprises:
assigning weighting to different channels in the sensing results, wherein the correlating the at least an additional portion of the sensing results with the predicted sensing information operates to utilize the assigned channel weighting and the probabilities with respect to the WSD being disposed at the plurality of particular locations within the one or more refined HPAs to provide probabilities with respect to TV white space channels therein being available to the WSD.

8. The method of claim 7, wherein providing the probabilities with respect to TV white space channels being available to the WSD comprises:
averaging channel availability within the one or more refined HPAs.

9. The method of claim 7, wherein calculating availability probabilities for the TV white space channels comprises:
mapping the correlations to the probabilities using a function selected from the group consisting of a probability density function of Gaussian distributions, a log-normal distribution, and measured statistics.

10. The method of claim 1, further comprising:
providing the selected one or more candidate white space channels to the WSD for selection of at least one white space channel for use in communications by the WSD.

11. The method of claim 10, wherein the providing the selected one or more candidate white space channels to the WSD includes providing transmit power level information in association with white space channels of the one or more candidate white space channels.

12. The method of claim 10, wherein the WSD is operable to select the at least one white space channel for use in the communications by the WSD at least in part based on the availability probabilities.

13. The method of claim 1, wherein the TV channel signals comprise television signals, and wherein the WSD comprises a television band device.

14. The method of claim 1, further comprising:
re-determining candidate white space channels by repeating the obtaining sensing results, the determining one or more HPAs, calculating probabilities with respect to the WSD being disposed at locations within the determined one or more HPAs, calculating availability probabilities for the TV white space channels, and selecting one or more TV white space channels as the candidate white space channels if it is determined that the sensing results have changed or if it is determined that a channel list has expired.

15. The method of claim 14, wherein the re-determining comprises:
utilizing previously reported sensing results and currently reported sensing results in the re-determining candidate white space channels.

16. A system for determining candidate white space channels for use by a white space device (WSD), the system comprising:
a processor;
a non-transitory processor readable memory in communication with the processor;
an enhanced white space database stored by the non-transitory processor readable memory, the enhanced white space database having a white space location database and predicted sensing information;
high probability area (HPA) prediction logic, executed by the processor, configured to analyze information from the enhanced white space database in combination with sensing results regarding television (TV) channel signals detected by the WSD and calculate probabilities of the WSD being located at each of a plurality of locations in one or more HPAs without using a location determination provided by the WSD, wherein the one or more HPAs correspond to geographic areas comprising the plurality of locations in the one or more HPAs at which the WSD may be located based upon the information from the enhanced white space database and the sensing results detected by the WSD;
combiner logic, executed by the processor, configured to analyze information from the enhanced white space database and the probabilities of the WSD being located at the plurality of locations in the one or more HPAs to provide availability probabilities of TV white space channels of unused TV channels within the one or more HPAs using an availability probability function summing the probabilities with respect to the WSD being disposed at the plurality of locations in the one or more HPAs corresponding to a TV white space channel of the TV white space channels available at one or more locations of the plurality of locations, wherein an availability probability of the availability probabilities for a TV white space channel provides a probability the TV white space channel is an available white space channel for the WSD and will not interfere with incumbent users; and
channel selection logic configured to select the candidate white space channels based on one or more TV white space channels having highest availability probabilities of the TV white space channels.

17. The system of claim 16, wherein the white space location database comprises information selected from the group consisting of:
one or more lists of available white space channel indices;
one or more lists of detectable channel indices;
one or more lists of predicted characteristics of detectable channels;
one or more lists of prohibited channels by regulation; and
one or more lists of other entities registered for protection.

18. The system of claim 16, wherein the predicted sensing information comprises:
prediction characteristic information including at least one of transmission station physical attribute information, communication area geographic information, or signal propagation models for channel signals from which the sensing results were detected, whereby the prediction characteristic information is utilized by the HPA prediction logic to calculate predicted characteristics of received channel signals and thereby provide predicted sensing information.

19. The system of claim 18, wherein the predicted sensing information comprises at least one of predicted receive signal strength values, predicted receive signal strength orders, or predicted receive signal strength variances.

20. The system of claim 19, wherein the sensing results include information to identify channels in which TV channel signals were detected by the WSD and one or more of receive signal strengths for the TV channel signals detected by the WSD, receive signal strength orders for the TV channel signals detected by the WSD, or receive signal strength variances for the TV channel signals detected by the WSD.

21. The system of claim 16, wherein the enhanced white space database is stored in association with an enhanced white space channel server.

22. The system of claim 21, wherein one or more of the HPA prediction logic, the combiner logic, and the channel selection logic are provided by the enhanced white space channel server.

23. The system of claim 21, wherein one or more of the HPA prediction logic, the combiner logic, and the channel selection logic are provided by the WSD.

24. A method of determining candidate white space channels for use by a white space device (WSD), the method comprising:
   obtaining sensing results from the WSD, the sensing results including information regarding television (TV) channel signals detected by the WSD without a location determination provided by the WSD;
   identifying one or more strong TV channel signals in the sensing results;
   using pattern matching to match the one or more strong TV channel signal with transmission station locations from an enhanced white space database, the enhanced white space database having channel usage location information and coverage area information for the transmission stations stored therein, the enhanced white space database further having predicted sensing information for a plurality of locations;
   defining one or more coarse high probability geographic areas (HPAs) in which the WSD has a high probability of being disposed in based at least in part on coverage areas of the stations matched to the one or more strong TV channel signals, wherein each HPA of the one or more coarse HPAs correspond to a respective geographic area comprising a plurality of locations at which the WSD may be located;
   correlating at least an additional portion of the sensing results with the predicted sensing information from the enhanced white space database for particular locations of the plurality of locations within the coarse HPAs to thereby provide one or more refined HPAs having unlikely locations for the WSD filtered from the coarse HPAs;
   calculating probabilities with respect to the WSD being disposed at locations of the plurality of locations at which the WSD may be located within the one or more refined HPAs;
   calculating availability probabilities for TV white space channels of unused TV channels within the one or more refined HPAs based upon an availability probability function summing the probabilities of the WSD being located at the particular locations of the plurality of locations at which the WSD may be located within the one or more refined HPAs corresponding to a TV white space channel of the TV white space channels available at one or more locations of the plurality of locations, wherein an availability probability of the availability probabilities for a TV white space channel provides a probability the TV white space channel is an available white space channel for the WSD and will not interfere with incumbent users; and
   selecting one or more TV white space channels having highest availability probabilities as the candidate white space channels for use by the WSD.

25. The method of claim 24, wherein the sensing results include information to identify channels in which TV channel signals were detected by the WSD and one or more of receive signal strengths for the TV channel signals detected by the WSD, receive signal strength orders for the TV channel signals detected by the WSD, or receive signal strength variances for the TV channel signals detected by the WSD.

26. The method of claim 25, wherein the predicted sensing information comprises at least one of predicted receive signal strength values, predicted receive signal strength orders, or predicted receive signal strength variances.

27. The method of claim 24, wherein the enhanced white space database comprises prediction characteristic information including at least one of transmission station physical attribute information, communication area geographic information, or signal propagation models for the channel signals, whereby the prediction characteristic information is utilized to calculate predicted characteristics of the channel signals and thereby provide the predicted sensing information.

28. The method of claim 24, wherein calculating availability probabilities for the TV white space channels comprises:
   assigning weighting to different channels in the sensing results, wherein the correlating the at least an additional portion of the sensing results with the predicted sensing information operates to utilize the assigned channel weighting to calculate probabilities with respect to the WSD being disposed at the particular locations within the one or more refined HPAs and provides probabilities with respect to TV white space channels therein being available to the WSD by averaging channel availability within the one or more refined HPAs.

29. The method of claim 28, wherein calculating availability probabilities for the TV white space channels comprises:
   mapping the correlations to the probabilities using a function selected from the group consisting of a probability density function of Gaussian distributions, a log-normal distribution, and measured statistics.

30. The method of claim 24, further comprising:
   providing the selected one or more candidate white space channels to the WSD for selection of at least one white space channel for use in communications by the WSD.

31. The method of claim 24, wherein the TV channel signals comprise television signals, and wherein the WSD comprises a television band device.

32. The method of claim 24, further comprising:
   re-determining candidate white space channels by repeating the obtaining sensing results, the defining one or more coarse HPAs, correlating at least an additional portion of the sensing results, calculating probabilities with respect to the WSD being disposed at locations, calculating availability probabilities for the TV white space channels, and selecting one or more TV white space channels as the candidate white space channels if it is determined that the sensing results have changed or if it is determined that a channel list has expired.

33. The method of claim 32, wherein the re-determining comprises:
   utilizing previously reported sensing results and currently reported sensing results in the re-determining candidate white space channels.

* * * * *